(12) United States Patent
McCready (10) Patent No.: US 11,299,097 B1
(45) Date of Patent: Apr. 12, 2022

(54) DEPLOYABLE STEP

(71) Applicant: Kraig McCready, Renton, WA (US)

(72) Inventor: Kraig McCready, Renton, WA (US)

(*) Notice: Subject to any disclaimer, the term of this patent is extended or adjusted under 35 U.S.C. 154(b) by 407 days.

(21) Appl. No.: 16/420,671

(22) Filed: May 23, 2019

(51) Int. Cl.
*B60R 3/02* (2006.01)

(52) U.S. Cl.
CPC ..................... *B60R 3/02* (2013.01)

(58) Field of Classification Search
CPC ........................................................ B60R 3/02
See application file for complete search history.

(56) References Cited

U.S. PATENT DOCUMENTS

| | | | |
|---|---|---|---|
| 2,122,040 A | 6/1938 | Machovec | |
| 2,533,050 A | 12/1950 | Runyen | |
| 2,747,888 A | 5/1956 | Jones | |
| 2,852,271 A | 9/1958 | McDonald | |
| 2,971,600 A | 2/1961 | Schultz | |
| 3,588,160 A * | 6/1971 | Reiner | B60D 1/54 293/119 |
| 3,756,622 A | 9/1973 | Pyle | |
| 4,194,754 A * | 3/1980 | Hightower | B60R 3/02 280/166 |
| 5,342,073 A | 8/1994 | Poole | |
| 6,237,927 B1 * | 5/2001 | Debo | B60R 3/02 280/166 |
| 6,530,588 B1 * | 3/2003 | Varney | B60R 3/007 280/163 |
| 6,554,311 B1 * | 4/2003 | Blankenship | B60D 1/06 280/164.1 |
| 6,655,706 B1 * | 12/2003 | Murrell | B60R 3/02 182/88 |
| 6,655,796 B2 | 12/2003 | Murrell | |
| 6,685,204 B1 * | 2/2004 | Hehr | B60R 3/02 280/164.1 |
| 7,661,693 B1 * | 2/2010 | Lipski | B60D 1/06 280/491.5 |
| 7,775,536 B2 | 8/2010 | Shumway | |
| 9,487,147 B1 * | 11/2016 | Morrill | B60R 3/02 |
| 9,522,634 B1 | 12/2016 | Smith | |
| 9,963,076 B1 * | 5/2018 | Bender | B62D 33/03 |
| 10,246,018 B1 * | 4/2019 | Chen | B60D 1/58 |
| 2001/0035625 A1 * | 11/2001 | Debo | B60R 3/02 280/166 |
| 2005/0006870 A1 * | 1/2005 | Williams | B60R 3/02 280/166 |
| 2006/0091642 A1 * | 5/2006 | Goldstein | B60R 3/02 280/504 |
| 2006/0170179 A1 * | 8/2006 | Dahl | B60R 9/06 280/163 |
| 2008/0042394 A1 * | 2/2008 | Park | B60R 3/02 280/166 |
| 2009/0079157 A1 * | 3/2009 | Fratzke | B60R 3/02 280/166 |
| 2010/0264618 A1 * | 10/2010 | Agoncillo | B60R 3/02 280/166 |

(Continued)

*Primary Examiner* — Katy M Ebner
(74) *Attorney, Agent, or Firm* — Cramer Patent & Design, PLLC; Aaron R. Cramer (57) ABSTRACT

A deployable step capable of being secured about an exterior portion of a vehicle hitch frame. On the underside portion of the hitch frame is a step capable of being slid beneath the hitch frame when not in use. During a towing event, the deployable step is able to remain secured to the hitch frame without being removed.

13 Claims, 5 Drawing Sheets

(56) References Cited

U.S. PATENT DOCUMENTS

| | | | | |
|---|---|---|---|---|
| 2015/0060205 A1* | 3/2015 | Blackwell | ................ | B60R 3/02 |
| | | | | 182/223 |
| 2015/0084304 A1* | 3/2015 | Mendoza | ................ | B60D 1/58 |
| | | | | 280/163 |
| 2015/0314733 A1* | 11/2015 | Knodle | .................... | B60R 3/02 |
| | | | | 280/166 |
| 2018/0037166 A1* | 2/2018 | Hunter | .................... | B60R 3/007 |
| 2021/0129758 A1* | 5/2021 | Wymore | ................. | B60D 1/58 |

* cited by examiner

DEPLOYABLE STEP

FIELD OF THE INVENTION

The presently disclosed subject matter is directed to a deployable step.

BACKGROUND OF THE INVENTION

With sales at an all-time high, the popularity of pickup trucks, SUV's, and vans as an everyday vehicle is more wide spread than it ever has been. Their utility and convenience in hauling items coupled with the availability of luxury interiors and extended cab space have made the pickup a popular alternative to other vehicles. The availability of aftermarket accessories also enhances the attractiveness of these vehicles trucks as well. One such aftermarket device is the step surface which connects to the receiver hitch to provide easier access to the interior or bed of the vehicle especially for children, elderly users or disabled users.

However, when the step is in place, no trailer can be connected. This forces the user to constantly place and remove the heavy step as needed. Should it be left in place, it protrudes from the rear of the vehicle where people can accidently bang their shins upon it, often accompanied by painful, long lasting bruising. Accordingly, there exists a need for a means by which the functionality and usefulness of vehicle hitch steps can be improved upon to address the problems as described above. The development of the deployable Trailer step fulfills this need.

SUMMARY OF THE INVENTION

The principles of the present invention provide for a retractable hitch-mounted step, comprises firstly, a motor vehicle having a bumper and an interior. The retractable hitch-mounted step is mounted on the motor vehicle. Secondly, an existing receiver hitch which utilizes a hitch attachment bar. The hitch attachment bar is installed below the bumper. The hitch attachment bar is supported by a receiver hitch structure. Thirdly, a movable step which is located between a left-hand side bracket and a right-hand side bracket and immediately below the hitch attachment bar and as such, provides ease of access half way between a grade and the interior of the motor vehicle above the bumper. The right-hand side bracket includes an upper section and a lower section. The upper section provides for a physical connection of the retractable hitch-mounted step to the receiver hitch, while the lower section provides for extension and retraction of the movable step. Lastly, a non-slip surface bordered by a step frame, the step frame rests within the track guides on the left-hand side bracket and the right-hand side bracket.

The motor vehicle may be selected from the group consisting of a van, a pickup truck, an SUV, or a passenger vehicle. The upper section may perform its connection action by use of a flange which connects around the receiver hitch structure. The flange may work in conjunction with a mechanical fastener such as a bolt. The bolt may be threaded through the right-hand side bracket, an angled shim, and a square plate. The angled shim may be provided with a matching angle to mate against the receiver hitch structure. The square plate may be provided with a threaded opening to accept and physically hold a mechanical fastener. The mechanical fastener may be a nut.

The mechanical fastener, the angled shim, and the square plate and the right-hand side bracket may be firmly held in place along all axes. The mechanical fastener, the angled shim, and the square plate and the left-hand side bracket may likewise be firmly held in place along all axes. The movable step may move in and out of the lower section along a travel path using a series of two track guides within the lower section. The movable step may be held in either a fully retracted or full extended state by use of a spring pin. The spring pin may engage a first hole when in an extended state as shown, or a second hole when in a retracted state. In a deployed state on motor vehicle, the movable step may facilitate an easy access transition step to the interior of the motor vehicle. The step stops located on an inside edge of the step frame may be engaged with the left-hand side bracket and the right-hand side bracket to eliminate any additional extension of the movable step. The step frames may be U-shaped. The retractable hitch-mounted step may be made of steel. The retractable hitch-mounted step may include a suitable protective finish that includes painting and/or plating to prevent corrosion. The retractable hitch-mounted step may be add-on kit for existing motor vehicle hitches.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 retractable hitch-mounted step
15 motor vehicle
20 receiver hitch
25 hitch attachment bar
30 bumper
35 vehicle tire
40 movable step
45 left-hand side bracket
50 right-hand side bracket
55 grade
60 receiver hitch structure
65 vehicle frame
70 upper section
75 lower section
80 flange
85 mechanical fastener
90 angled shim 95 square plate
100 matching angle
105 threaded opening
110 travel path "a"
115 track guide
120 spring pin
125 first hole
130 second hole
135 step stop
140 non-slip surface
145 step frame

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
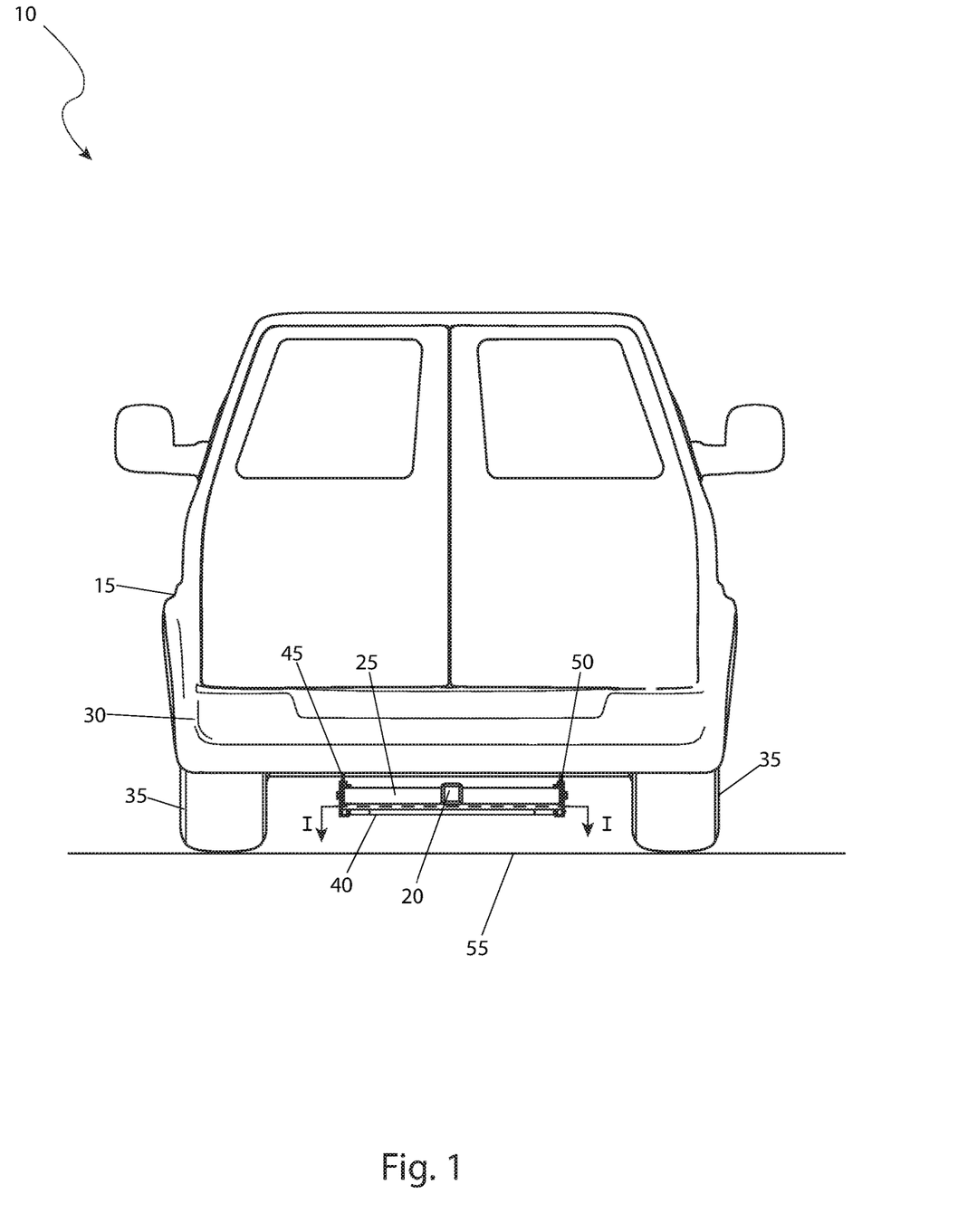
FIG. 1 is a front view of the retractable hitch-mounted step 10 for a motor vehicle 15, according to the preferred embodiment of the present invention.

Referring now to FIG. 1, a front view of the retractable hitch-mounted step 10 for a motor vehicle 15, according to the preferred embodiment of the present invention is disclosed. The retractable hitch-mounted step 10 (herein also described as the "retractable step") 10, is mounted on a motor vehicle 15, herein depicted as a van. However, other types of vehicles such as pickup trucks, SUV's, and even passenger vehicles could be utilized with the teachings of the present invention. As such, the use of the retractable step 10 with a specific type of vehicle is not intended to be a limiting factor of the present invention. The retractable step 10 works in conjunction with an existing receiver hitch 20 that utilizes a hitch attachment bar 25. It is envisioned that the hitch attachment bar 25 would be installed below the bumper 30 and would be a minimum of approximately one foot (1 ft.) wide up to a maximum of the clear distance, typically within the clear distance between the vehicle tires 35. A movable step 40 is provided between a left-hand side bracket 45 and a right-hand side bracket 50, immediately below the hitch attachment bar 25 and as such, provides ease of access approximately half way between the grade 55 and the interior of the motor vehicle 15 above the bumper 30. Additionally, the elevated access provided by the retractable step 10 may be useful in reaching items held upon the roof of the motor vehicle 15 such as on a roof rack (not shown).

Figure 2:
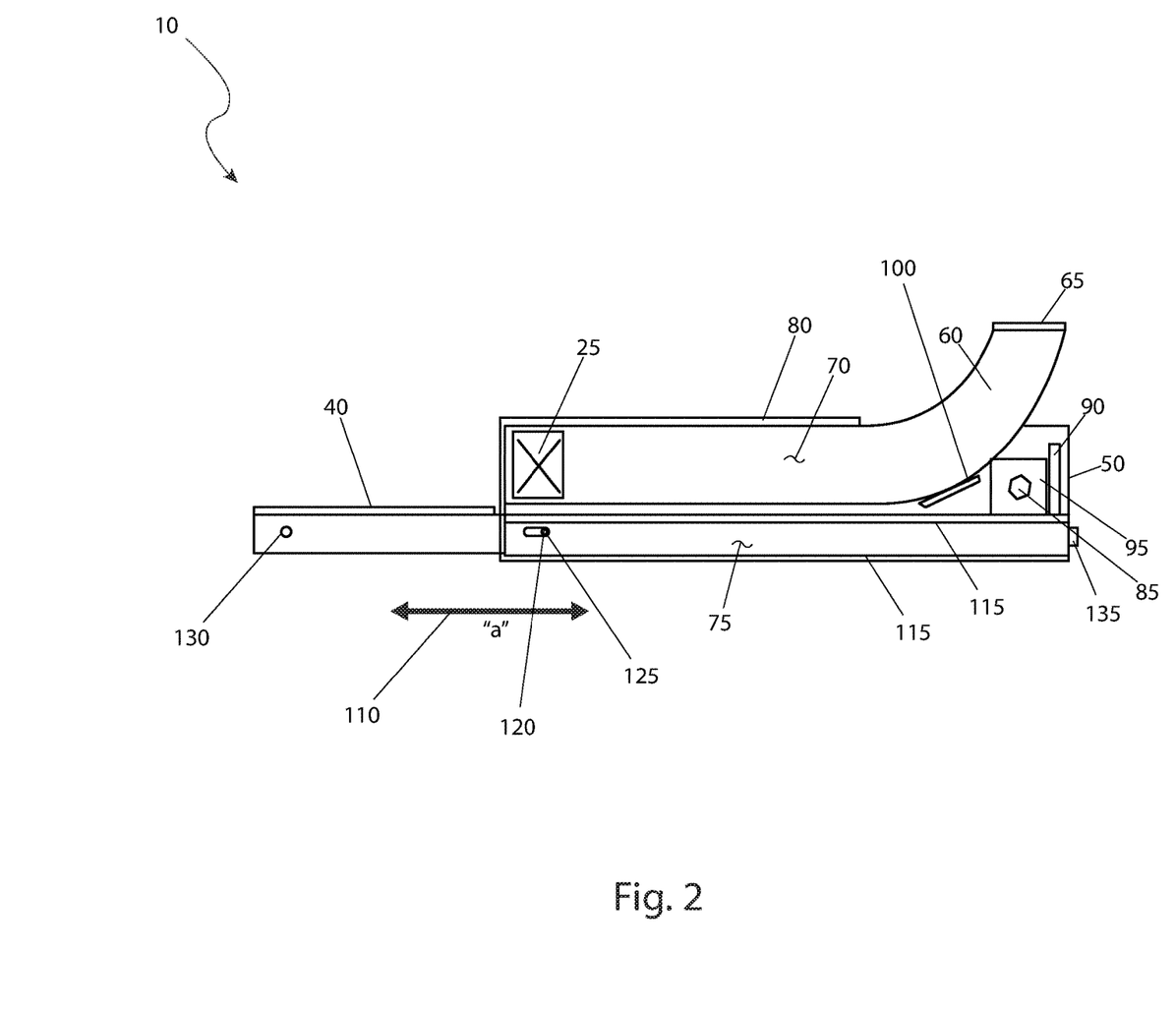
FIG. 2 is a side view of the retractable hitch-mounted step 10, according to the preferred embodiment of the present invention.

Referring next to FIG. 2, a side view of the retractable step 10, according to the preferred embodiment of the present invention is depicted. This view discloses the right-hand side bracket 50 with the left-hand side bracket 45 (as shown in FIG. 1) being similar. The hitch attachment bar 25 is supported by a receiver hitch structure 60. It is noted that the receiver hitch structure 60 is typical in design and may vary per manufacture of the receiver hitch 20 (as shown in FIG. 1). The right-hand side bracket 50 includes an upper section 70 and a lower section 75. The upper section 70 provides for the physical connection of the retractable step 10 to the receiver hitch 20, while the lower section 75 provides for the extension and retraction of the movable step 40. The upper section 70 performs its connection action by use of a flange 80 which connects around the receiver hitch structure 60. The flange 80 then works in conjunction with a mechanical fastener 85 such as a bolt which is threaded through the right-hand side bracket 50, an angled shim 90, and a square plate 95. The angled shim 90 is provided with a matching angle 100 to mate against the receiver hitch structure 60. The square plate 95 is provided with a threaded opening 105 (not shown due to illustrative limitations) to accept and physically hold the mechanical fastener 85. A matching fastener such as a nut, may also be utilized. The use of any particular style or type of mechanical fastener 85 is not intended to be a limiting factor of the present invention. As can be seen with the aid of the mechanical fastener 85 the angled shim 90 and the square plate 95, the right-hand side bracket 50 is firmly held in place along all axes. Similar securement is utilized with the left-hand side bracket 45 (as shown in FIG. 1).

The movable step 40 moves in and out of the lower section 75 along a travel path "a" 110 using a series of two (2) track guides 115 within the lower section 75. The movable step 40 is held in either a fully retracted or full extended state by use of a spring pin 120. The spring pin 120 engages a first hole 125 when in an extended state as shown, or a second hole 130 when in a retracted state. It is envisioned that the spring pin 120 would be utilized on either the right-hand side bracket 50 or the left-hand side bracket 45 (as shown in FIG. 1). The use of the spring pin 120 on any side of the retractable step 10 is not intended to be a limiting factor of the present invention. One (1) of two (2) step stops 135 is visible at the interior end of the lower section 75. These step stops 135 prevents over travel of the movable step 40 and stops further outward travel.

Figure 3:
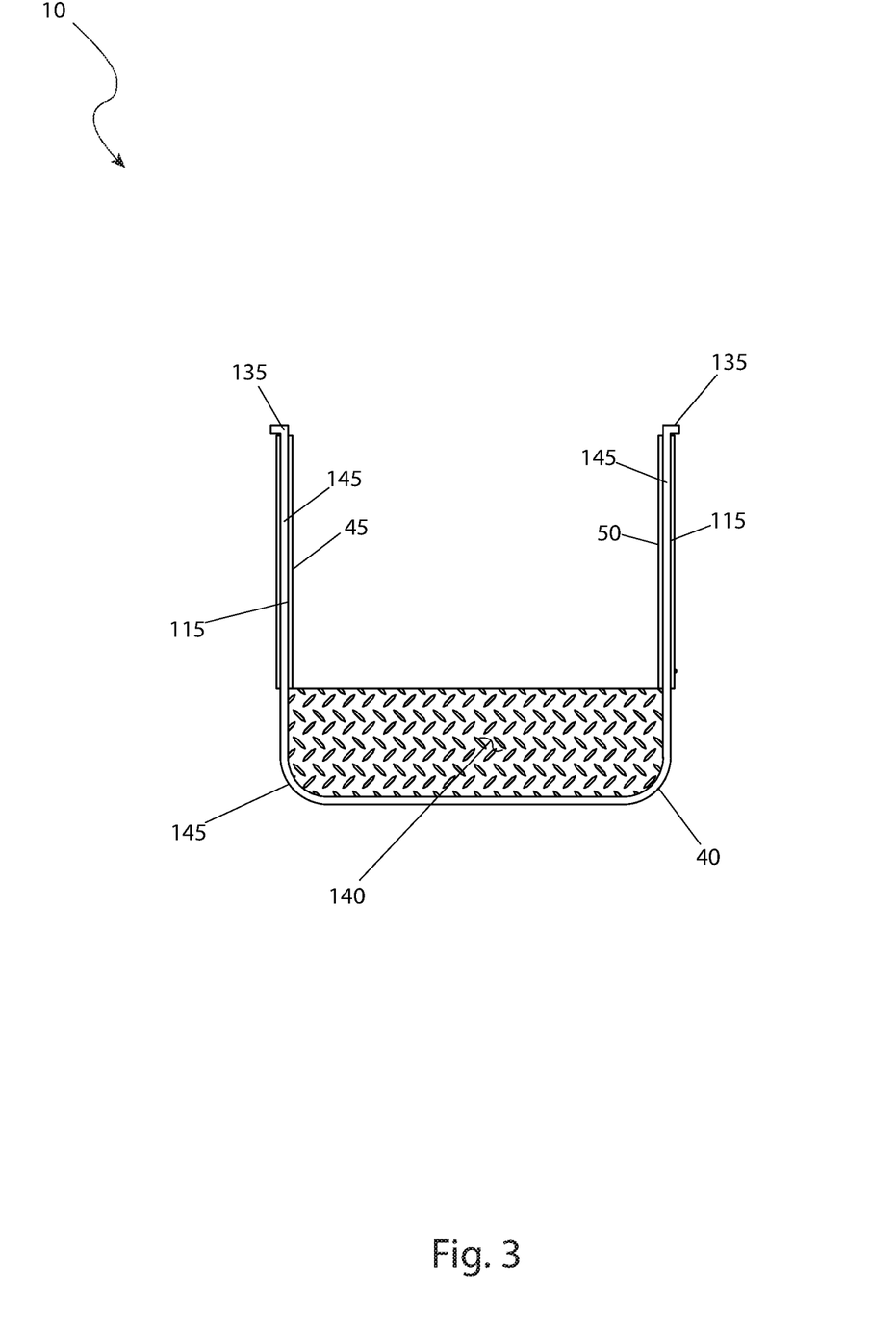
FIG. 3 is a sectional view of the retractable hitch-mounted step 10, as seen along a line I-I, as shown in FIG. 1, according to the preferred embodiment of the present invention.

Referring now to FIG. 3, a sectional view of the retractable step 10, as seen along a line I-I, as shown in FIG. 1, according to the preferred embodiment of the present invention is shown. The movable step 40 comprises a non-slip surface 140 bordered by a "U"-shaped step frame 145. The step frame 145 rests within the track guides 115 on both the left-hand side bracket 45 and the right-hand side bracket 50. Both of the step stops 135, located on the inside edge of the step frame 145 are engaged with the left-hand side bracket 45 and the right-hand side bracket 50 to eliminate any additional extension of the movable step 40.

Figure 4:
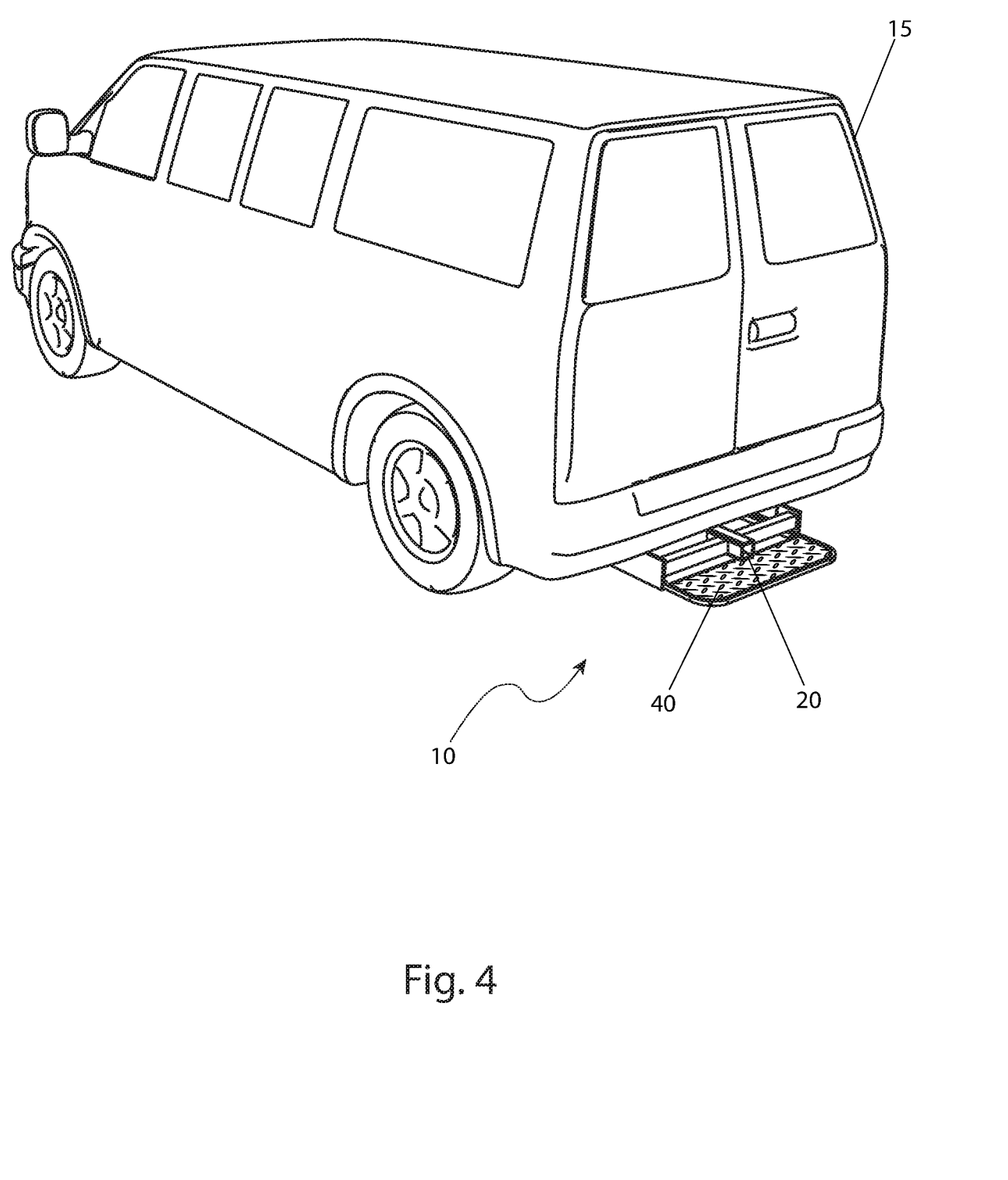
FIG. 4 is a perspective view of the retractable hitch-mounted step 10 shown in a deployed state on motor vehicle 15, according to the preferred embodiment of the present invention; and, FIG. 5 is a perspective view of the retractable hitch-mounted step 10 shown in a retracted state on motor vehicle 15, according to the preferred embodiment of the present invention.

Referring next to FIG. 4, a perspective view of the retractable step 10, shown in a deployed state on motor vehicle 15, according to the preferred embodiment of the present invention is disclosed. In said position, the movable step 40 provides an easy access transition step to the interior of the motor vehicle 15. The movable step 40 is wide and easy to access should be carrying a load or wearing large heavy boots. The majority of the components used in the retractable step 10 would be made of steel that is cut to size according to a pattern. After manufacture, a suitable protective finish such as paint or plating would be applied to prevent corrosion. It is envisioned that the invention would be provided as standard or optional equipment on new motor vehicle hitches as well as being made available as an add-on kit for existing motor vehicle hitches. It is envisioned that the moveable step 40 of the retractable step 10 can support up to four hundred pound (400 lb.) single point load.

Figure 5:
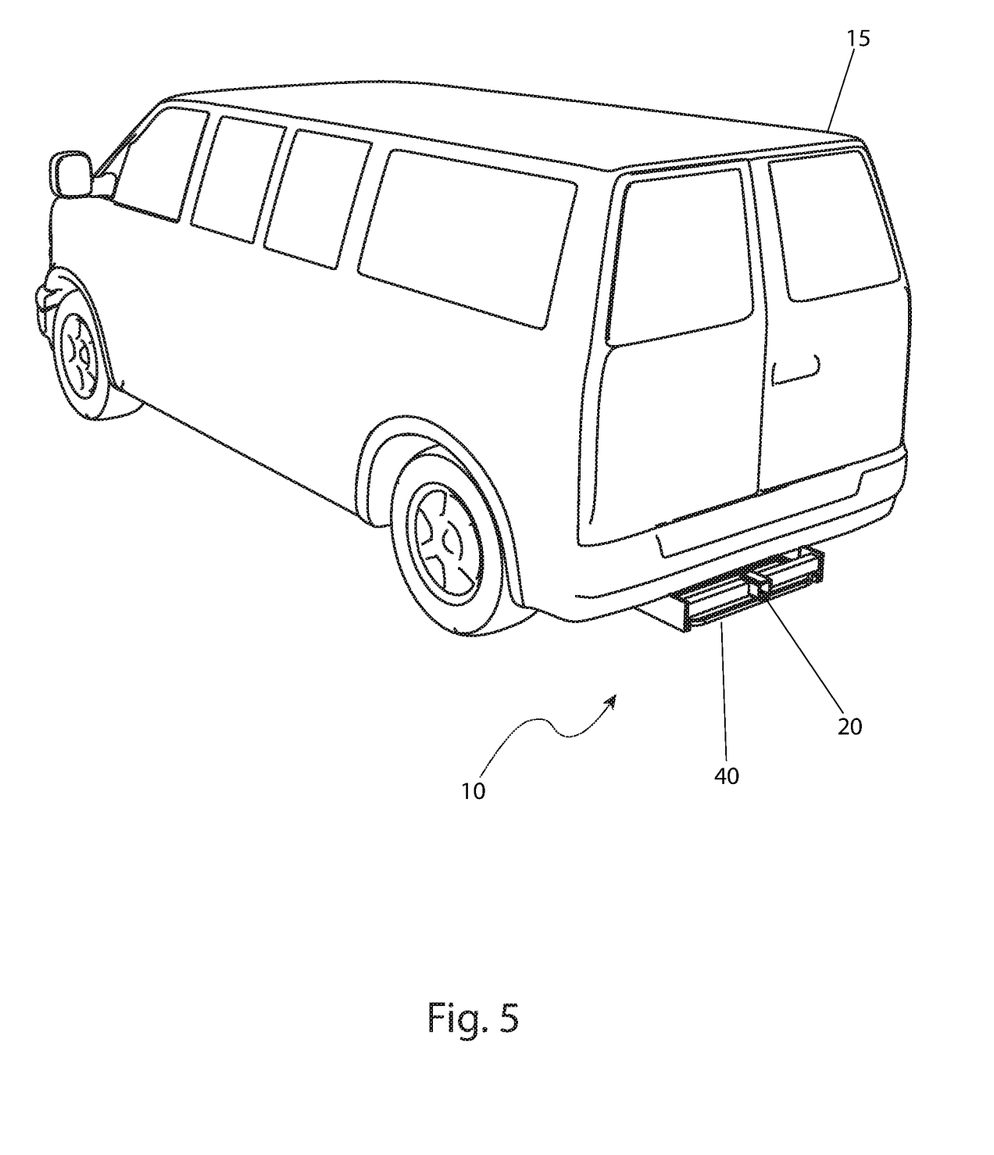

Referring to FIG. 5, a perspective view of the retractable step 10, shown in a retracted state on motor vehicle 15, according to the preferred embodiment of the present invention is depicted. In the retracted configuration, the movable step 40 is under the motor vehicle 15. This eliminates any interference with the receiver hitch 20 and allows it to function in a normal manner. This configuration also eliminates the possibility of unwanted contact with the movable step 40, such as when walking in a parking lot or closing an overhead garage door. The movable step 40 is safely stored in position and only requires sliding in and to transition to its utilized position as shown in FIG. 4. No heavy components must be lifted in or out of place or require storage space.

2. Operation of the Preferred Embodiment

The preferred embodiment of the present invention can be utilized by the common user in a simple and effortless manner with little or no training. It is envisioned that the retractable step 10 would be constructed in general accordance with FIG. 1 through FIG. 5. The user would procure the retractable step 10 through normal procurement channels such as new vehicle manufacturer, aftermarket auto parts stores, mail order houses or the like. Particular attention would be paid to overall width, size, color, and the like.

After procurement and prior to utilization, the retractable step 10 would be prepared in the following manner: separating the left-hand side bracket 45 and the right-hand side bracket 50 and physically forcing one (1) of the brackets onto the respective side of the receiver hitch 20; securing the bracket using the mechanical fastener 85, the angled shim 90, and the square plate 95; sliding the movable step 40 into the installed bracket; and, installing the opposite bracket using the same procedure as described for the first bracket.

During utilization of the retractable step 10, the following procedure would be initiated: for deploying the movable step 40, the user would manipulate the movable step 40 with one (1) hand, releasing the spring pin 120 with the other, and extending the movable step 40 along the travel path "a" 110, until the spring pin 120 engages the first hole 125.

After use of the retractable step 10, it is retracted by grabbing the movable step 40 with one (1) hand, releasing the spring pin 120 with the other, and retracting the movable step 40 along the travel path "a" 110 until the spring pin 120 engages the second hole 130.

The usage of the retractable step 10 allows for easy access into and out of the motor vehicle 15 and provides a handy step on tall vehicles, makes accessing the top or interior of the vehicle 15 easier and safer and eliminates need for ladder or stool.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A retractable hitch-mounted step, comprising:
   a motor vehicle having a bumper and an interior, said retractable hitch-mounted step is removably mounted on said motor vehicle;
   an existing receiver hitch utilizing a hitch attachment bar, said hitch attachment bar is installed below said bumper, said hitch attachment bar is supported by a receiver hitch structure;
   a movable step provided between a left-hand side bracket and a right-hand side bracket immediately below said hitch attachment bar and as such, provides ease of access halfway between a grade and said interior of said motor vehicle above said bumper, said right-hand side bracket includes an upper section and a lower section, said upper section provides for a physical connection of said retractable hitch-mounted step to said receiver hitch, while said lower section provides for extension and retraction of said movable step;
   a non-slip surface bordered by a step frame, said step frame rests within a series of two track guides on said left-hand side bracket and said right-hand side bracket;
   an angled shim is provided with a matching angle to mate against said receiver hitch structure; and
   a square plate is provided with a threaded opening to accept and physically hold a mechanical fastener;
   wherein said upper section performs its connection action by use of a flange which connects around said receiver hitch structure;
   wherein said flange works in conjunction with the mechanical fastener;
   wherein said movable step is held in either a fully retracted or full extended state by use of a spring pin; and
   wherein the spring pin engages a first hole when in an extended state or a second hole when in a retracted state.

2. The retractable hitch-mounted step according to claim 1, wherein said motor vehicle is selected from the group consisting of a van, a pickup truck, an SUV, or a passenger vehicle.

3. The retractable hitch-mounted step according to claim 1, wherein said mechanical fastener is a nut or a bolt.

4. The retractable hitch-mounted step according to claim 1, wherein said mechanical fastener, said angled shim, and said square plate, said right-hand side bracket are firmly held in place along all axes.

5. The retractable hitch-mounted step according to claim 1, wherein said mechanical fastener, said angled shim, and said square plate, said left-hand side bracket are firmly held in place along all axes.

6. The retractable hitch-mounted step according to claim 1, wherein said movable step moves in and out of said lower section along a travel path using said series of two track guides within said lower section.

7. The retractable hitch-mounted step according to claim 1, wherein in a deployed state on motor vehicle, said movable step facilitates an easy access transition step to said interior of said motor vehicle.

8. The retractable hitch-mounted step according to claim 1, wherein a plurality of step stops located on an inside edge of said step frame are engaged with said left-hand side bracket and said right-hand side bracket to eliminate any additional extension of said movable step.

9. The retractable hitch-mounted step according to claim 1, wherein said step frames are U shaped.

10. The retractable hitch-mounted step according to claim 1, wherein said retractable hitch-mounted step is made of steel.

11. The retractable hitch-mounted step according to claim 10, wherein said retractable hitch-mounted step includes a suitable protective finish that includes painting to prevent corrosion.

12. The retractable hitch-mounted step according to claim 10, wherein said retractable hitch-mounted step includes a suitable protective finish that includes plating to prevent corrosion.

13. The retractable hitch-mounted step according to claim 1, wherein said retractable hitch-mounted step is an add-on kit for existing motor vehicle hitches.

* * * * *